(12) United States Patent
Taswell

(10) Patent No.: US 8,886,628 B1
(45) Date of Patent: *Nov. 11, 2014

(54) MANAGEMENT OF MULTILEVEL METADATA IN THE PORTAL-DOORS SYSTEM WITH BOOTSTRAPPING

(75) Inventor: Carl Taswell, Ladera Ranch, CA (US)

(73) Assignee: Akeakamai, Inc., Ladera Ranch, CA (US)

( * ) Notice: Subject to any disclaimer, the term of this patent is extended or adjusted under 35 U.S.C. 154(b) by 249 days.

This patent is subject to a terminal disclaimer.

(21) Appl. No.: 13/111,803

(22) Filed: May 19, 2011

Related U.S. Application Data

(60) Provisional application No. 61/348,224, filed on May 25, 2010, provisional application No. 61/412,280, filed on Nov. 10, 2010, provisional application No. 61/159,773, filed on Mar. 12, 2009.

(51) Int. Cl.
*G06F 17/00* (2006.01)
*G06F 17/30* (2006.01)

(52) U.S. Cl.
USPC .......................... 707/707; 707/714; 707/771

(58) Field of Classification Search
USPC .......... 707/707–709, 760, 771, 999.003, 714, 707/737, 755, 758, 794, 795, 811; 709/202, 709/203, 217–219
See application file for complete search history.

(56) References Cited

U.S. PATENT DOCUMENTS

| 6,151,624 | A | * | 11/2000 | Teare et al. | 709/217 |
| 8,335,778 | B2 | * | 12/2012 | Ghosh et al. | 707/708 |
| 2006/0122876 | A1 | * | 6/2006 | Von Schweber et al. | 705/10 |

* cited by examiner

*Primary Examiner* — Marc Filipczyk

(57) ABSTRACT

The PORTAL-DOORS System has been designed as a distributed network system with hierarchical authorities for entity registering and attribute publishing of mobile metadata. An alternate bootstrapping design with self-referencing and self-describing features has been implemented with an integrated model for the combined registry-directories that co-exists with the independent model for the separate registries and directories. The concept of multilevel metadata about metadata has been implemented with the use of entity, record, infoset, representation and message metadata. This multilevel metadata about metadata improves the efficiency of search and analysis of the metadata content within the networked system. The methods facilitate search of varying scope both within and across the registries, directories and registry-directories focused on different problem oriented domains. Maintaining the integrity of these problem oriented domains serves to improve the efficiency of search throughout the system.

8 Claims, 7 Drawing Sheets

PORTAL-DOORS System Data Records: Resource metadata is registered and published by agents for search by users in the PORTAL-DOORS server networks. *Semantic* services here are defined as those using the RDF/OWL/SPARQL stack of technologies, whereas *lexical* services are defined as those using only character string processing, terminologies, or those XML technologies that do not require use of RDF triples. Fields within data records are considered *required* or *permitted* with respect to the schemas maintained by the root servers. The figure displays only the most important fields; for all fields, see the reference model implemented with XML Schemas.

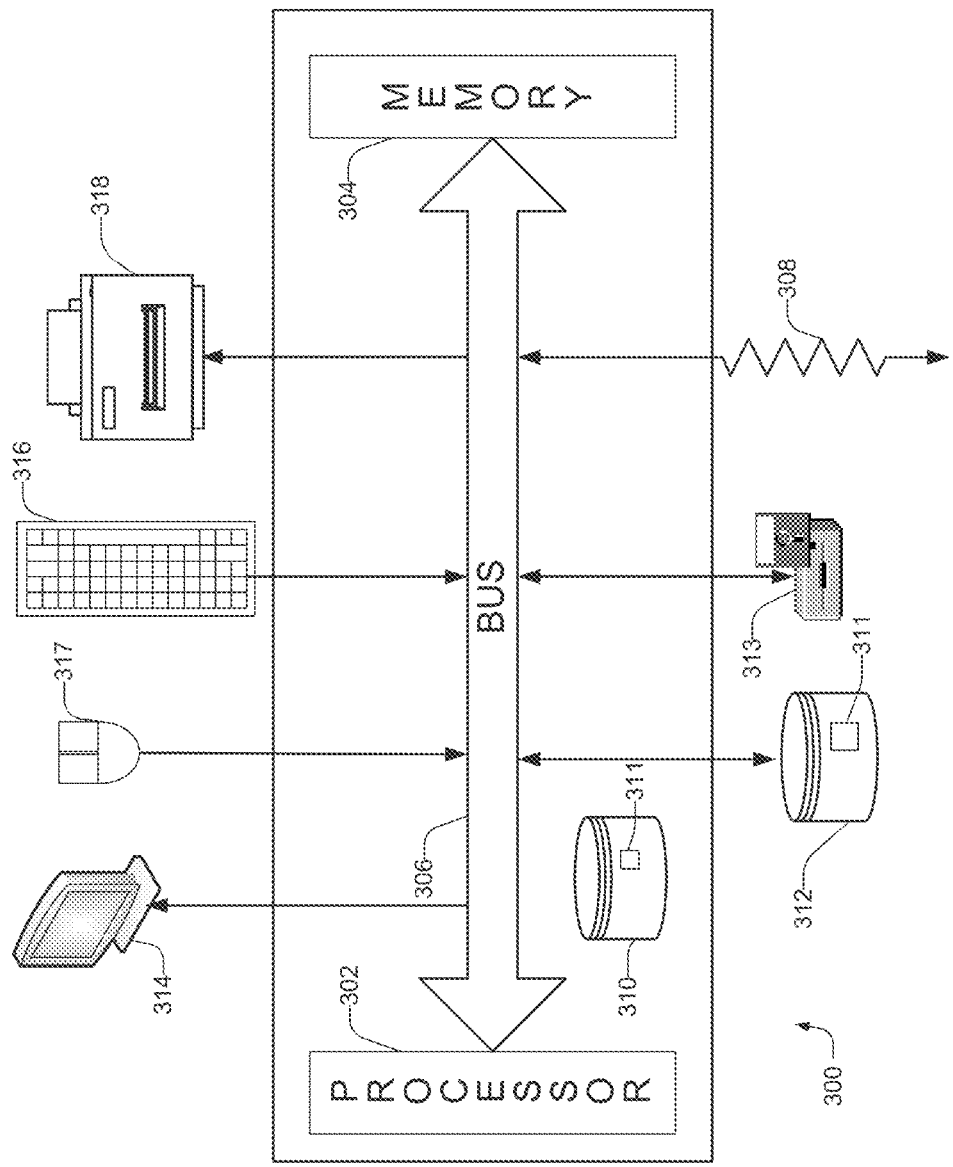
Figure 1: Block diagram of general purpose computer, ie, a computing machine with device components including processor, memory, storage, display, keyboard, mouse, etc.

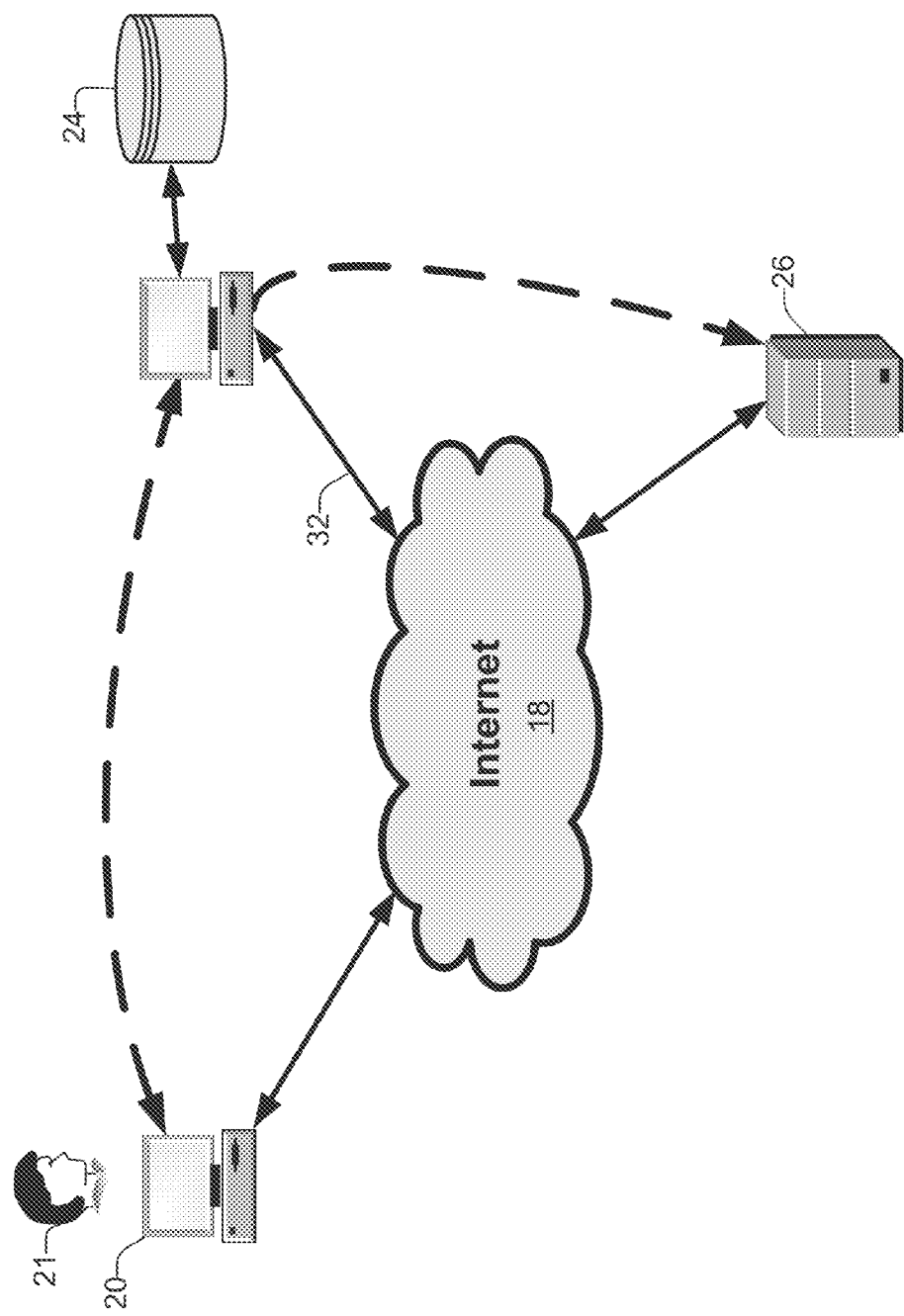
Figure 2: Block diagram of user interacting with computer and distributed network devices connected by the internet.

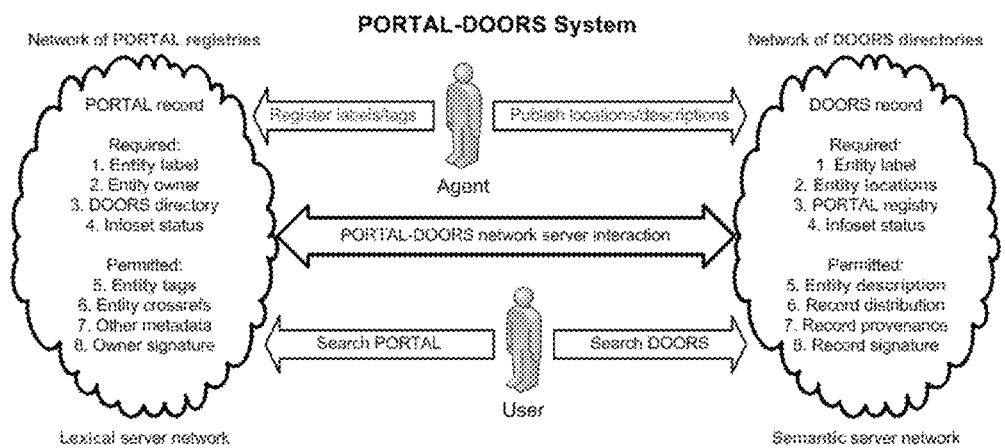

Figure 3: PORTAL-DOORS System Data Records: Resource metadata is registered and published by agents for search by users in the PORTAL-DOORS server networks. *Semantic* services here are defined as those using the RDF/OWL/SPARQL stack of technologies, whereas *lexical* services are defined as those using only character string processing, terminologies, or those XML technologies that do not require use of RDF triples. Fields within data records are considered *required* or *permitted* with respect to the schemas maintained by the root servers. The figure displays only the most important fields; for all fields, see the reference model implemented with XML Schemas.

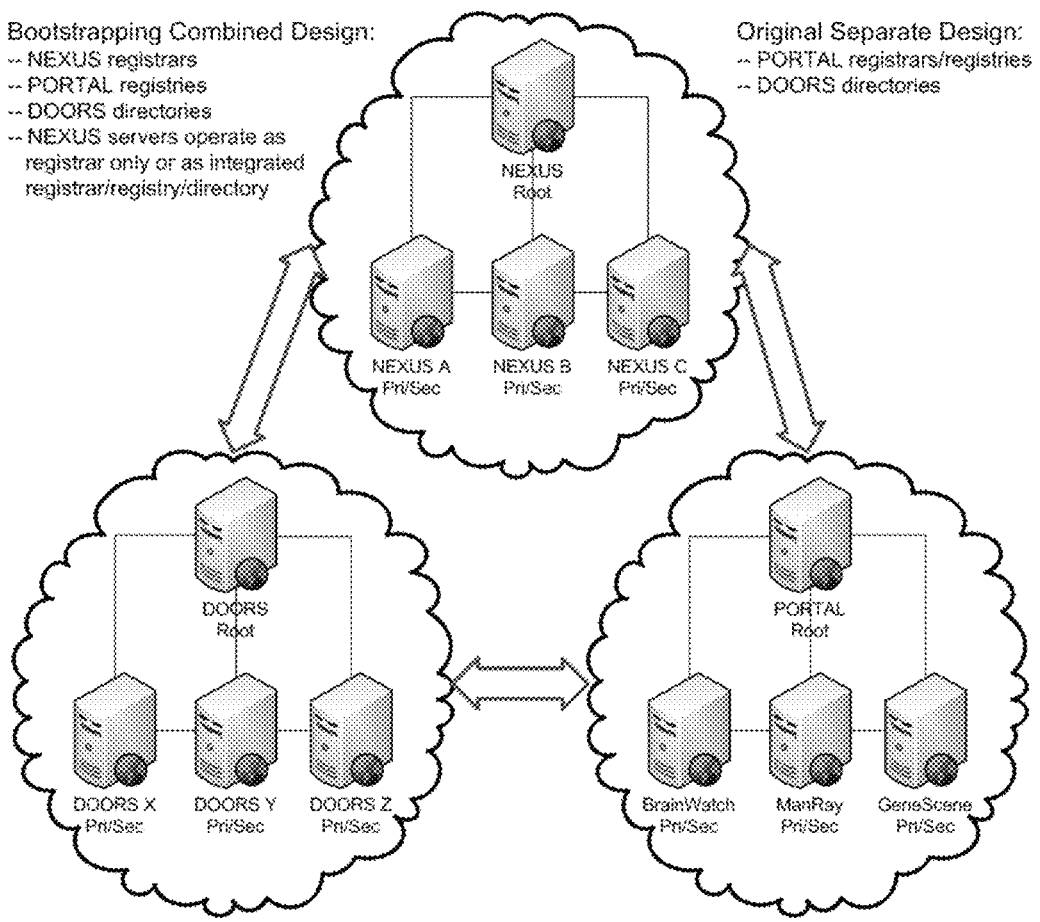

Figure 4: PORTAL-DOORS System Server Network: PDS server networks with interacting clouds of NEXUS registrars, PORTAL registries, and DOORS directories. NEXUS servers may expose either the NEXUS registrar service for the separate design or the integrated set of NEXUS registrar, PORTAL registry, and DOORS directory services for the combined design. These resource metadata server networks for PORTAL registering of labels and tags and DOORS publishing of locations and descriptions are analogous to domain metadata server networks for IRIS registering of names and DNS publishing of addresses. Primary PORTAL registries may be established by an organization or person who maintains any local policies governing registration of resources at that particular primary PORTAL registry. Examples shown here (GeneScene, BrainWatch, ManRay) implement policies with a problem-oriented focus on their respective specialty domains. Specific criteria for registration are determined by the local schema of the PORTAL primary which must nevertheless comply with the global requirements of the PORTAL root in order to assure interoperability between different PORTAL primaries.

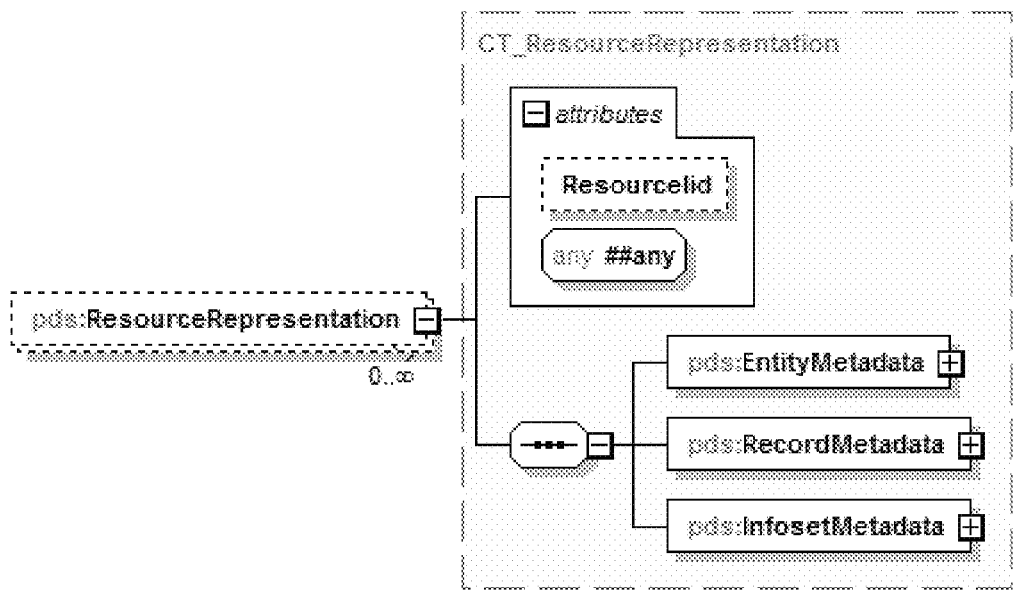
Figure 5: Resource representation: entity metadata is primary or *Level 1* metadata about the entity itself, record metadata is secondary or *Level 2* metadata about the *Level 1* metadata, and infoset metadata is tertiary or *Level 3* metadata about the *Level 1* and *Level 2* metadata.

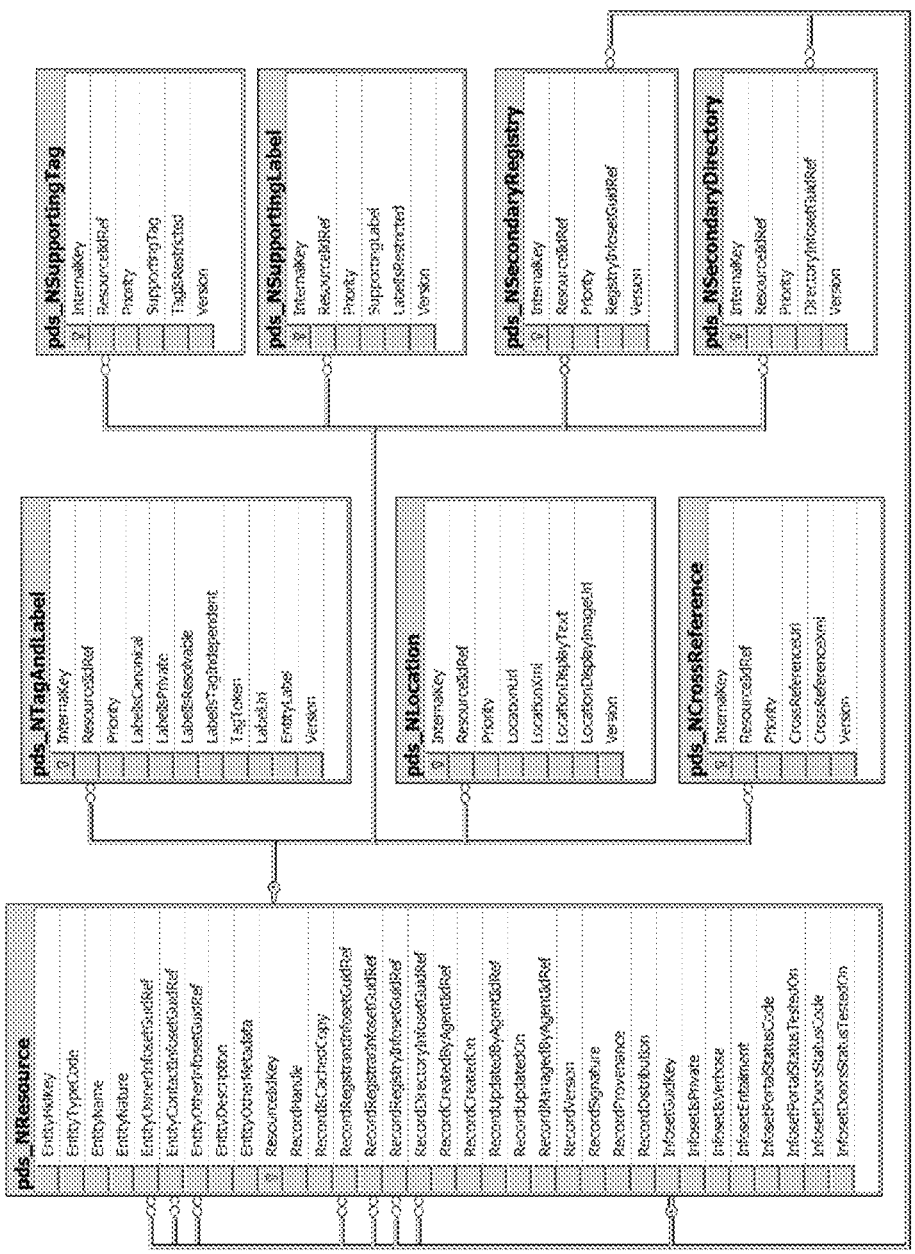
Figure 6: Relational database model for NEXUS combined design server with integrated storage of both PORTAL and DOORS data record fields as a NEXUS data record. See Figure 7 for the administrative content of a NEXUS record.

Figure 7: Relational database model for the auxiliary and administrative support tables for system and agent management in relation to the main table for the NEXUS combined design server. See Figure 6 for the non-administrative content of a NEXUS record.

MANAGEMENT OF MULTILEVEL METADATA IN THE PORTAL-DOORS SYSTEM WITH BOOTSTRAPPING

1 CROSS-REFERENCE TO RELATED APPLICATIONS

This application claims priority from provisional patent applications
61/159,773 Bootstrapping System for the PORTAL-DOORS Cyberinfrastructure with Self-Referencing and Self-Describing Features by Carl Taswell, filed Mar. 12, 2009,
61/348,224 Metadata Management Methods for the POR-TAL-DOORS System with Bootstrapping, Self-Referencing, Self-Describing and Multilevel Features by Carl Taswell, filed May 25, 2010,
61/412,280 Improving Search Query Efficiency by Maintaining the Integrity of Problem Oriented Domains in the POR-TAL-DOORS System by Carl Taswell, filed Nov. 10, 2010,
and relates to a prior patent application
Ser. No. 11/859,741 PORTALS and DOORS for the Semantic Web and Grid by Carl Taswell, filed Sep. 21, 2007,
that was approved as patent
U.S. Pat. No. 7,792,836 PORTALS and DOORS for the Semantic Web and Grid by Carl Taswell, issued Sep. 7, 2010.

2 BACKGROUND OF THE INVENTION

The present invention generally relates to managing online metadata about online and offline resources, i.e., managing online data that locates and describes resources which may be either online or offline. More specifically, as a resource metadata management system, the invention provides a mechanism for addressing the internet and accessing the semantic web and grid. The PORTAL-DOORS System has been described in the applicant's prior U.S. Provisional Patent Application 60/94,451 filed on 17 Jun. 2007 [1] and United States Patent Application 20080313229 which was filed 21 Sep. 2007, published 18 Dec. 2008, and issued 7 Sep. 2010 as U.S. Pat. No. 7,792,836 with all related prior art including other patents as cited therein [2].

The present invention improves upon the prior invention by adding new methods to the PORTAL-DOORS System that address the following problems:
  How to improve the efficiency of communications and operations between different network nodes within the system at different stages of development and build-out of the distributed network of registrars, registries and directories.
  How to improve the efficiency of analysis of metadata contained within the records maintained by the distributed network of registrars, registries and directories.
  How to enable metadata records, considered secondary resources, to provide information about other metadata records, considered primary resources, when the respective authors of the primary and secondary resources are different.
  How to define and differentiate one problem oriented domain from another in the PORTAL-DOORS System in order to improve the efficiency of performing search queries within each problem oriented domain.
Solutions to these problems are described herein and in the Provisional Applications 61/159,773, 61/348,224, and 61/412,280 with their attachments of manuscripts previously submitted with the Provisional Applications. Those manuscripts have since been published as
  Alternative Bootstrapping Design for the PORTAL-DOORS Cyberinfrastructure with Self-Referencing and Self-Describing Features by Carl Taswell, in Semantic Web; Wu, G., Ed.; IN-TECH Publishing, 2009; chapter 2, pp. 29-7,
  A Distributed Infrastructure for Metadata about Metadata: The HDMM Architectural Style and PORTAL-DOORS System by Carl Taswell, 2010 Future Internet 2(2):156-189,
  Concept Validating Methods for Maintaining the Integrity of Problem Oriented Domains in the PORTAL-DOORS System by Carl Taswell, in AMIA IDAMAP 2010: Intelligent Data Analysis in Biomedicine and Pharmacology, November 2010, Washington D.C.; pp. 78-79 in Workshop Notes edited by K. T. Phillips and S. Swift,
which are also attached and incorporated herein.

2.1 Hierarchically Distributed Mobile Metadata

IRIS registries [3] and DNS directories [4] provide the model for the architectural style that inspired the design of PORTAL registries and DOORS directories [5]. The most essential characteristics of this Hierarchically Distributed Mobile Metadata (HDMM) architectural style can be summarized by the following principles:
  1. Distributed infrastructure: Pervasively distributed and shared infrastructure, content, and control of content including distributed and shared control over both the contribution and distribution of the content defined as the mobile metadata records.
  2. Hierarchical authorities: A hierarchy of both authoritative and non-authoritative servers (root, primary, secondary, forwarding and caching) enabling global interoperable communication and exchange of the mobile metadata records while permitting independent administrative control of local policies governing the publication and distribution of the metadata records.
  3. Mobile metadata: A focus on moving the mobile metadata for who what where as fast as possible with pervasive distribution and redistribution from servers in response to requests from clients that access non-authoritative local forwarding and caching servers updated regularly by the authoritative servers.
  4. Separated concerns: A separation of concerns with registries for identifying resources and directories for locating resources that have been globally uniquely identified in the registries.
  5. Unrestricted identification: A relative freedom of choice in the selection of identifiers with purposeful absence of any requirement to use the same root name or label for all identifiers, thus enabling essentially unrestricted choice of naming or labeling schemes for identification and thereby avoiding monopolistic control by any single organization.

Users of today's web browsers may not be familiar with the engineering of the hidden infrastructure system that enables them to navigate to any web site around the world. But it is the IRIS-DNS infrastructure system, which is responsible for registering domain names and mapping them to numerical IP addresses, that makes it possible for the user to browse the web in such an effortless manner almost always without ever typing, seeing, or even being aware of the existence of the numerical IP addresses.

Moreover, from the user's perspective, what is most important now is that the speed of this conversion from domain name to IP address occurs so rapidly that the user does not experience it as a hindrance or delay in browsing. Even if the particular web page itself downloads and displays slowly, usually at least the web site address is found quickly. And that happens because the small amount of metadata (domain name and IP address) moves so quickly across the internet even if the larger amount of data (web page text and media) does not. Because of this important point, the phrase Hierarchically Distributed Mobile Metadata and acronym HDMM was introduced (9 May 2009 at www.portaldoors.org) as a name for this architectural style that characterizes both IRIS-DNS and PORTAL-DOORS.

of the term hierarchical pertains to the distribution of metadata records but not to the identification of resources (see Table 1).

Whereas IRIS-DNS implements the HDMM architectural style for the original web, PORTAL-DOORS extends and implements this style for the semantic web and grid. Table 1 summarizes some of the similarities and differences between PORTAL-DOORS and IRIS-DNS from the perspective of considering both as distributed online database systems with entity registering and attribute publishing implemented with the HDMM architectural style (see HDMM Principles 1-5).

TABLE 1

HDMM Systems with Entity Registering and Attribute Publishing

|  | IRIS-DNS System | PORTAL-DOORS System |
|---|---|---|
| Dynamic metaphor | A distributed communications network brain of nodal neurons continuously updating, exchanging, and integrating messages about 'who what where' | |
| Static metaphor | A simple phonebook | A sophisticated library card catalogue |
| Registering system | IRIS registries | PORTAL registries |
| Entity registered | domain | resource |
| Identified by | unique name | unique label with optional tags |
| Publishing system | DNS directories | DOORS directories |
| Attributes published | address and aliases | locations and descriptions |
| Specified by | IP numbers | URIs, URLs, RDF triples referencing OWL ontologies |
| Entity identification | Hierarchical URL | Non-hierarchical URI |
| Record distribution | Hierarchical request forwarding and response caching | Hierarchical request forwarding and response caching |
| Serves original web | Yes, via mapping of character name to numeric address | Yes, via mapping of character label to URL for IRIS-DNS |
| Serves semantic web | No, because IRIS-DNS does not use RDF triples | Yes, via mapping of character label to semantic description |
| Crosslinks entities | No | Yes, via mappings within DOORS descriptions to other resources |
| Crosslinks systems | No | Yes, via mappings within PORTAL cross-references to other systems |

The term mobile metadata emphasizes the principle that the metadata moves throughout the distributed network of nodes which may include both stationary nodes such as wired rackmount servers and mobile nodes such as wireless handheld devices. When considering the latter case, the movement of the mobile metadata and the movement of the mobile node must be understood as different kinds of mobility. More generally, mobile metadata must be distinguished from mobile software and from mobile systems. Further, in the acronym HDMM, the MM serves as a mnemonic not only for Mobile Metadata but also for Metadata about Metadata, while the D recalls not only Distributed referring to location but also Dynamic referring to content. In other words, the metadata may both move to distributed and redistributed locations throughout the network, and also change frequently or intermittently with dynamically updated content.

These HDMM principles do require hierarchical control and distribution of metadata records, but do not require hierarchical identification of resources. Whereas IRIS-DNS does employ a hierarchical identification scheme with top-level domain names, domain names, and sub-domain names, POR-TAL-DOORS does not require any such hierarchical naming scheme. In fact, PORTAL-DOORS allows complete freedom with an identification scheme for which globally unique labels are simply required to be URIs. These URIs may or may not be hierarchical, and they may or may not be resolvable URLs, as long as they are URIs. However, both IRIS-DNS and PORTAL-DOORS systems do employ hierarchical control and distribution of metadata records. Thus, for the purposes of defining an architectural style applicable to both IRIS-DNS and PORTAL-DOORS, the interpretation and use

3 BRIEF SUMMARY OF THE INVENTION

The present invention builds upon the prior PORTAL-DOORS System comprised of a distributed network of registrars, registries and directories for resource metadata management (U.S. Pat. No. 7,792,836) by the addition of the following new methods:

A more efficient method advantageous during early stages of PORTAL-DOORS System adoption and use when it is more convenient to integrate all registrar, registry and directory functionalities into a single combined component named NEXUS.

A more efficient method with self-referencing and self-describing features embodied in the data structures in such a way as to minimize the number of different structures and reduce their overall complexity.

A method that can co-exist with the original method such that the PORTAL functionality can reside both in separate PORTAL components and in the new combined NEXUS component.

A method that can co-exist with the original method such that the DOORS functionality can reside both in separate DOORS components and in the new combined NEXUS component.

A method that adds a new mechanism with record status codes for exchanging information about the status of related records between the PORTAL, DOORS, and NEXUS components.

A method that optimizes PORTAL functionality for lexical search, DOORS functionality for semantic search, and NEXUS functionality for both lexical and semantic search.

A method that enables a multilevel management of metadata about metadata with entity metadata, record metadata and infoset metadata.

A method that enables management of metadata for metaresources, which are secondary resources about primary resources.

Methods to define and differentiate one problem oriented domain from another in the PORTAL-DOORS System and thereby to maintain the integrity of each domain. These methods enable the efficiency of performing search queries within each domain to be improved because there are no irrelevant or inappropriate records that slow the search in each domain.

Methods to allow a variety of means to test for the presence of required concepts and thereby to validate each record. These methods offer greater flexibility in the use of the system by enabling metadata records to be validated through tests either on the name, nature, supporting tags, or supporting labels on the PORTAL side or on the description on the DOORS side of the PORTAL-DOORS System.

Methods to perform the validation test by ordering the sub-tests from fastest to slowest with termination of the sequence of sub-tests on first success in order to provide the most efficient approach to complete the validation test.

Methods to delete or otherwise to move a metadata record to a different domain if that metadata record fails the validity test for the problem oriented domain in order to assure that the integrity of each problem oriented domain corresponding to a defined PORTAL registry is not compromised, and thus, the efficiency of search is not compromised.

4 BRIEF DESCRIPTION OF THE DRAWINGS

Each of these drawings have already appeared in similar form in the prior patent [2] and/or prior publications [5, 6] by the inventor:

FIG. 1 displays a block diagram illustrating a general purpose computer.

FIG. 2 displays a block diagram illustrating an exemplary physical and logical view of the operation of the present invention with a user interacting with a computer and other distributed network devices connected by the internet.

FIG. 3 displays a diagram summarizing the basic structure of an exemplary PORTAL data record and a DOORS data record each with both required and permitted fields, in accordance with one embodiment of the present invention.

FIG. 4 displays a diagram representing an exemplary PORTAL-DOORS distributed hierarchical database system with the PORTAL and DOORS networks of root, authoritative, and non-authoritative servers all interacting with each other, in accordance with one embodiment of the present invention;

FIG. 5 displays a schema of the top level of a resource representation with multilevel metadata comprised of entity metadata, record metadata and infoset metadata.

Each of these drawings displays a diagram of a relational database model in a manner that is standard in the database industry with diagram elements representing the tables, the columns within each table, and the relationships between the primary keys and foreign keys of each table:

FIG. 6 shows the relational database model for a NEXUS combined design server with integrated storage of both PORTAL and DOORS data record fields as a NEXUS data record. This figure displays the master-detail relationships for the non-administrative content of a NEXUS record.

FIG. 7 shows the relational database model for the auxiliary and administrative support tables for system and agent management in relation to the main table for the NEXUS combined design server. This figure displays the master-detail relationships for the administrative content of a NEXUS record.

5 DETAILED DESCRIPTION OF THE INVENTION 5.1 Combined Versus Separate Architectural Models PORTAL-DOORS has been designed to be as flexible as possible with both backward and forward compatibility from Web 1.0 to Web 3.0. Given the partition with lexical non-semantic services on the PORTAL side and semantic services (with use of the RDF/OWL/SPARQL stack) on the DOORS side, and also the partition with both required and permitted elements for each of PORTAL and DOORS, there are many possible scenarios for usage of the entire PORTAL-DOORS System. Some examples include:

Minimal use of required elements for both PORTAL registries and DOORS directories: This scenario essentially reduces use of the system to an alternative equivalent to the use of PURLs [7] (and other similar services). However, it does so without requiring use of a pre-determined URL identifier root like purl.ocic.org and instead allowing use of any identification scheme as long as it is a URI or IRI.

Maximal use of permitted elements for PORTAL registries but minimal use of required elements for DOORS directories: This scenario enables exploiting the full metadata management facilities of the PORTAL non-semantic services (which include provisions for tags, micro-formats, cross-references, etc) without any obligation to use the DOORS semantic services (that necessitate use of the RDF/OWL/SPARQL stack of technologies and tools). This scenario enables resource agents to publish metadata now in non-semantic formats and defer until later any possible transition to semantic formats which would then be facilitated by the prior staging in the non-semantic formats.

Minimal use of required elements for PORTAL registries but maximal use of permitted elements for DOORS directories: This scenario serves those situations where there is no barrier to transition the metadata from original web formats to semantic web formats, and the resource owner and agent do not wish to maintain the metadata in both semantic and non-semantic formats. This scenario requires that the resource agent registering and publishing the metadata already has access to established ontologies that can be referenced by semantic tools for describing the resource.

Maximal use of permitted elements for both PORTAL registries and DOORS directories: This usage scenario provides the significant benefit of exposing as much metadata as possible to as many clients as possible including both older non-semantic as well as newer semantic tools and applications.

Consideration of these scenarios when further motivated by the goal of building a more efficient and less complex approach to bootstrap the distributed network system results in the architectural design of the new combined NEXUS architectural model for a server node that integrates the resource metadata and functionalities of separate nodes corresponding to each of a PORTAL registry and a DOORS directory.

Separate PORTAL-DOORS model with separate independent servers for each PORTAL registry and DOORS directory: A PORTAL server is an online database server capable of storing and exchanging PORTAL metadata records in PDS PORTAL format. The PORTAL server provides user read-only access to PORTAL records via a PORTAL registry service and agent read-write access to PORTAL records via a PORTAL registrar service. A DOORS server is an online database server capable of storing and exchanging DOORS metadata records in PDS DOORS format. The DOORS server provides user read-only access to DOORS records via a DOORS directory service and agent read-write access to DOORS records via a DOORS registrar service.

Combined NEXUS model with a combined integrated server for both PORTAL registries and DOORS directories: A NEXUS server is an online database server capable of storing and exchanging NEXUS metadata records in PDS NEXUS format, PORTAL records in PDS PORTAL format or DOORS records in PDS DOORS format. The NEXUS server provides user read-only access to NEXUS records via a NEXUS registry-directory service and agent read-write access to NEXUS records via a NEXUS registrar service.

The record fields that comprise a NEXUS metadata record are the union of the record fields for a PORTAL metadata record and a DOORS metadata record. Thus a single combined NEXUS registry-directory server can stand in the place of both a separate PORTAL registry server and a separate DOORS directory server, thereby reducing the complexity of the system when bootstrapping the system. Since the combined model architecture can co-exist with the separate model architecture, when bootstrapping is no longer necessary, a phased transition can occur so that the efficiencies of the separate model can later be exploited when appropriate.

5.2 Multilevel Metadata

Managing the mobile metadata, both conceptually and technically, with regard to a hierarchy of metalevels also serves the goals of improving the efficiency of metadata analysis and search. Analysis of the metalevels hierarchy begins with consideration of the collection of objects relevant to the resource in varying contexts.

1. Resource entity: The object of interest considered by the registrant to be the resource whether concrete or abstract, online or offline, semantic or lexical, real or virtual. This resource entity may be registered at a particular PORTAL registry only if it satisfies the registration requirements of that PORTAL registry. Depending upon the problem-oriented specialty domain of the PORTAL registry and its registration policies, examples may include persons, patients, investigators, authors, or organizations; online virtual entities or offline physical entities; data services, data storage tools, and data records (independent of and unrelated to any PORTAL-DOORS metadata record); analysis services and data processing tools; authored information, books, journals, papers, web sites, and web pages; and many other examples and categories within any field of interest defined by the administrators of the particular PORTAL registry.
2. Resource record: The database object containing information about the resource entity for the purpose of persistent storage. This resource record is stored in a database at a PDS server (a PORTAL, DOORS, or NEXUS server). Note that for the same resource entity, the information stored in a resource record at a PORTAL, DOORS, or NEXUS server will be different, and may also be different within each of the networks of PORTAL, DOORS, and NEXUS servers depending on their operation as authoritative primary or non-authoritative secondary and caching servers.
3. Resource infoset: The memory object containing information about the resource entity for the purpose of managing, displaying, and analyzing the information about the resource entity of interest. This resource infoset is assembled by the responding PDS server that gathers all of the relevant information from possibly multiple distributed records located at various different PORTAL, DOORS, and NEXUS servers.
4. Resource representation: The serialized object, obtained from the memory object, representing all of the information collected and assembled about the resource entity for the purpose of interoperable information exchange compliant with the PDS interface. One or more of these resource representations are sent by the PDS server in response to requests from clients if the server is configured to return a response without a message envelope.
5. Resource message: The message object containing one or more serialized resource representations within an envelope for the purpose of interoperable information exchange compliant with the PDS interface. This resource message is exchanged between different PDS servers and/or is sent by the targeted PDS server in response to requests from clients.

The term information is used in the list above in a general sense referring to content without implying any special connotations about a hierarchy of metadata levels. This term information will continue to be used to refer to any part of the content collectively contained in all of the metadata levels independent of any discussion of data versus metadata versus meta-metadata, or of multilevel metadata.

Metadata can be associated with each of the five objects listed above. The following list summarizes the metadata for each of the five objects together with the design principles that govern software implementation for the database, web service, and interoperable messaging interface schemas for the PORTAL-DOORS System.

1. Entity metadata: All metadata pertaining to the entity itself including tags, labels, locations and description of the entity as well as references to the owner and contact for the entity; corresponds to PDS schema element EntityMetadata and considered primary or Level 1 metadata about the entity itself.
2. Record metadata: All metadata pertaining to the stored records about the entity and the process of registering and managing the records including timestamps for creating and updating the records, references to the governing registries and directories, as well as references to the registrant and agents for the records; note that the registrant and agent for the records may be different from the owner and contact for the entity; corresponds to PDS schema element RecordMetadata and considered secondary or Level 2 metadata about the Level 1 metadata.
3. Infoset metadata: All metadata pertaining to the dynamic infoset about the entity assembled from the distributed stored records including status, validation timestamps if validated, and any entailments if inferred by a reasoning engine; corresponds to PDS schema element InfosetMetadata and considered tertiary or Level 3 metadata about the Level 1 and Level 2 metadata.

4. Representation metadata: Current design limited to use with only an identifier as an attribute on a wrapper element collating the three elements EntityMetadata, RecordMetadata, and InfosetMetadata respectively for the primary, secondary, and tertiary metadata; corresponds to PDS schema type ResourceRepresentation with element instances PORTAL, DOORS, and NEXUS.
5. Message metadata: All metadata pertaining to the messaging envelope and the process of exchanging messages throughout the PORTAL-DOORS System; design based on using an analogy with the IRIS-DNS System; corresponds to PDS schema element PDS as the root element for all PDS messages.

5.3 Metaresources

The original blueprint design [5] specified that resources can only be registered and managed by owners of the resources. This design principle yields a system that does not allow anonymous public editing of resources which is contrary to the policies adopted by many wiki systems. However, it is possible to design a new extension of the initial PORTAL-DOORS System that maintains the original principle while also enabling secondary resources to be registered and managed by individuals who are not the owners of the primary resource. These secondary resources about primary resources are called metaresources. The secondary metaresources are declared by specifying their entity type as a special type called meta-entity. Secondary metaresources are required to maintain a reference to their targeted primary resources. This approach assures that all metaresources about the same targeted resource can refer consistently to that resource yet be managed independently of it as the primary resource and of each other as the other secondary resources. A scientific journal article as primary resource with multiple reviews as secondary metaresources constitute a simple example. All of the referees who write the secondary reviews and the authors who write the article should have control over their own resources without interference by others.

5.4 Problem Oriented Domains

The PORTAL-DOORS System specifies a set of data exchange interface requirements that facilitate interoperability and search across problem oriented domains for both the original web and semantic web [5]. The administrators for any PORTAL registry may declare a set of constraints which define the focus of its specialty domain or problem scope as a Problem Oriented Registry of Tags And Labels. Resource representations entered as records for a given PORTAL registry should be validated against the set of constraints defined for that registry. If the representations are not validated for the registry within the time period required by that registry, the records considered invalid should either be deleted from the registry or else moved to a different more appropriate registry [5]. Failure to do so, ie, failure to maintain the integrity of the domain scope for each registry by allowing irrelevant and/or inappropriate records to remain in any registry would defeat one of the most important purposes of building a problem oriented registry system.

The original PDS design [5] introduced supporting tags (formatted as text phrases) while the revised PDS design [6] subsequently introduced supporting labels (formatted as URIs) for metadata records describing resources. Supporting tags are intended for use with text phrases in a manner consistent with current conventional free-text tagging systems. Supporting labels are intended for use with URIs in a manner that references a controlled vocabulary, terminology or thesaurus as demonstrated in [8] for the NLM MeSH 2010 Thesaurus. All of the supporting tags and/or supporting labels for metadata records are marked as either restricted or unrestricted with regard to the registry's problem oriented constraints. If the tag or label is marked restricted, then it is subjected to validity testing for the restrictions imposed by the registry's constraints. If the tag or label is not marked restricted, then it is not validity tested. This approach enables each metadata record to be curated with some tags and labels that are validity tested as well as some that are not validity tested, thus permitting an author to provide as much metadata as desired while adhering to the restrictions required by the registry for compliance with its problem oriented domain.

6 CONCEPT VALIDATING METHODS

All metadata records entered in a PORTAL registry are concept validity tested for compliance with any concept restrictions imposed by the scope definition declared by the administrators of the registry. For example, the GeneScene PORTAL Registry requires that any registered resource must maintain a metadata description with concepts relating to genetics, genes, DNA, RNA, etc, while the ManRay PORTAL Registry requires that resource records contain descriptions with concepts relating to radiopharmaceuticals, molecular imaging or nuclear medicine.

For the exemplary embodiment (see below), several conventions have been adopted to facilitate initial entry of metadata records. The elements entity name and entity nature are considered special automatically restricted supporting tags, ie, supporting tags that are always automatically marked as restricted and thus always validity tested. Further, the algorithm tests in order first the entity name and entity nature, then any other restricted supporting tags, and last any restricted supporting labels terminating with successful validation as soon as possible. In other words, if the name and nature are sufficient to validate the record successfully then the other tags and labels are not tested.

The PORTAL-DOORS System employs a bootstrapping design with a self-referencing self-describing approach [9]. Thus, the metadata record for a resource that is a PORTAL Registry itself contains the lists of constraints used to define the problem oriented domain for the registry. These lists can be found in the registry restrictions element of the other metadata element for metadata records available at http://pds.portaldoors.org/npds/portal for any of the registries selected by its name, for example, http://pds.portaldoors.org/npds/portal/genescene/npds/portal/genescene http://pds.portaldoors.org/npds/portal/manray/npds/portal/manray http://pds.portaldoors.org/npds/portal/osler/npds/portal/osler http://pds.portaldoors.org/npds/portal/helpme/npds/portal/helpme each of which contains the word stems and phrases used for validity testing tags and the thesaurus concepts used for validity testing labels of other metadata records entered in that registry.

Note that an author or curator of a metadata record may choose an arbitrary number of either supporting tags and/or supporting labels to describe the resource entity. These tags and labels may or may not be related to the defining concepts that restrict the problem oriented domain for the PORTAL registry. To provide a more complete description of a resource entity, an author may choose to use some tags and labels that relate directly to the defining concepts for the PORTAL registry and some that do not. Thus, there is good cause for both restricted and unrestricted tags and labels. However, keep in mind that currently the concept validating methods for the records in the registry first evaluate the restricted supporting tags (including entity name and entity nature) and then the restricted supporting labels.

For the 4 registries presented above to demonstrate the use of restrictions to maintain the integrity of problem oriented domains, their scopes are declared essentially as genetics for GeneScene, nuclear medicine for ManRay, personalized medicine for Osler, and Health Education Law Public Policy and Medical Ethics for HELPME where detailed lists of word stems, word phrases, and thesaurus concepts can be reviewed by browsing the metadata record links above for each registry. These lists contain elements with the attributes AndIndex and OrIndex which correspond to the simple conjunctive and disjunctive Boolean logic that is used in the concept validating algorithm. The current embodiment validates records for presence of concepts. An alternative embodiment could provide additional tests for absence of concepts.

6.1 Exemplary Embodiment

An exemplary embodiment of the invention requires the first of the following kinds of components all of which can co-exist and interact with each other:
1. A NEXUS server operating in combined mode as an integrated registrar/registry/directory with functionality equivalent to that combined from both a PORTAL registry and a DOORS directory with a registrar,
2. A NEXUS server operating in separate mode as a registrar for separate PORTAL registry and DOORS directory servers,
3. A PORTAL server operating in separate mode with PORTAL registry functionality,
4. A DOORS server operating in separate mode with DOORS directory functionality.

Alternative embodiments allow the co-existence and operation of all components (NEXUS, PORTAL, and DOORS servers) with NEXUS servers operating in both separate and combined modes. Each of the components must implement multilevel metadata management methods for metadata about metadata and for metaresources about resources.

When providing registrar services for separate PORTAL and DOORS nodes, NEXUS registrars operate in a manner consistent with the original separate design. However, when providing registrar services for a combined PORTAL-DOORS node, NEXUS registrars can also operate in a manner that enables integrated storage of both PORTAL and DOORS record data on the same server as currently implemented in version 0.6 and reported here. FIG. 6 displays a diagram depicting the relational database model for the draft version 0.6 of the PDS schemas available at www.portaldoors.org. This data structure model shows the primary and foreign keys that provide referential integrity constraints for the relational database tables of a NEXUS server node in the network system. FIG. 7 displays the main table in relation to the auxiliary and administrative support tables for managing agent access to the system.

These figures present conventional diagrams for relational database models. Each part represents a database table identified with its name at the top and its column field names listed below the table name. The key symbols indicate the primary keys for each table and the connecting lines point to the foreign keys of another table. More detailed explanations of the parts identified and named in the diagram appear in the following paragraphs below.

All PDS tables in the database are named with the prefix pds_ to distinguish them from the tables of other administrative providers such as Microsoft's ASP.net authentication and authorization services and their database tables named with the prefix aspnet_. Further, in order to simulate management of PORTAL, DOORS, and NEXUS network nodes at the same site in the same database, the tables for each of these servers are named respectively with the prefixes pds_P, pds_D, and pds_N while tables common to all three server types are named with the prefix pds_A. In the following discussion, the prefix pds_ appears in the figures but not in the text where it should be assumed.

With a conventional master-detail relationship, the table NResource serves as the main table for NEXUS resource records with primary key ResourceIidKey (an integer identifier) for the related records connected in a one-to-many relationship via foreign keys ResourceIidRef in each of the dependent tables NTagAndLabel, NLocation, NCrossReference, NSupportingTag, NSupportingLabel, NSecondaryRegistry, and NSecondaryDirectory. With the column ordering for the main table NResource as displayed in FIG. 6, note that the fields displayed above the primary key ResourceIidKey are entity metadata fields whereas those displayed below the primary key are first the record metadata fields and then the infoset metadata fields.

Because of the conceptual distinctions between the different kinds of metadata and the different ways that the metadata can be used, providing distinct keys for the different subsets of metadata offers greater convenience for various usage interface and programming contexts. The primary key ResourceIidKey is intended mostly for internal use with the foreign keys ResourceIidRef by the database to maintain the master-detail relationships between the main and dependent tables for the virtual record created for each resource. All other keys visible as explicit fields in the main table NResource of FIG. 6 are considered optional: EntityHidKey is a T-SQL hierarchical identifier for the entity, RecordHandle is a character string identifier for the record, and InfosetGuidKey is a T-SQL globally unique identifier for the infoset.

Technically, the PDS design specification requires only the resource label as the globally unique identifier for the resource metadata record. Although not visible as an explicit field, it is available as the EntityCanonicalLabel from a T-SQL view on the related tables NResource and NTagAndLabel. Data types for the optional keys have been chosen to facilitate conventions as well as meaningful intended uses. For example, ResourceIidKey as an integer is used to maintain all master-detail table relations for a single resource (see in FIG. 6 all foreign keys linking into the right side of the field ResourceIidKey in the table NResources), while InfosetGuidKey as a guid (the T-SQL uniqueidentifier datatype) is used to maintain all references from one resource to another distinct resource within the self-referencing self-describing scheme of the relational data model (see in FIG. 6 all foreign keys linking into the left side of the field InfosetGuidKey in the table NResource).

As another example, short-length character string handles for a record are more appropriate for agents (if persons, not webbots) editing the record at a single site, whereas medium-length guids for an infoset are more appropriate for servers communicating and exchanging records between multiple PDS sites. For internal PDS processing (interpreted as either within a single PDS server or within the PDS network between PDS servers), medium-length guids can also be more convenient than potentially very long-length labels assuming that the guids and labels are maintained in a strict one-to-one mapping correspondence for the same resource.

Using more than one identifier (i.e., in addition to the required resource label), such as the example pair of both a record handle and a resource label, also enables the agent to maintain the information for the resource entity—even changing the label—without being required to delete the record and create a new record. The new facility that enables the use of alias labels together with the canonical label for a resource entity provides another mechanism to achieve a similar task while also enabling use of multiple different identifiers appropriate in different contexts or at different times. In this case, both a newer alias and an older alias can be maintained in addition to the canonical label if desired. Alternatively, an alias label can be re-declared to be the current canonical label.

For the resource entity metadata within the main table NResource, there are three directly self-referencing relations from fields with the suffix _GuidRef to three other resources for the EntityOwner, EntityContact, and EntityOther. Any resource may be registered with references EntityOwner and EntityContact to other resources for the entity owner and contact, but only metaresources of the special type meta-entity may be registered with a reference EntityOther to the targeted primary resource. In fact, the metaresource cannot be validated without this reference EntityOther. For the resource record metadata within the main table NResource, there are four directly self-referencing relations from fields with the suffix _GuidRef to four other resources for the EntityRegistrant, EntityRegistrar, EntityRegistry, and EntityDirectory.

There is no requirement that the necessary information for all of these seven other possible resources be stored at the same NEXUS server node. However, if so, then each can be referenced via the _GuidRef, and if not, then it can be referenced via the analogous _Label fields (not shown in FIG. 6). For example, the resource for the EntityContact can be referenced internally via the EntityContactGuidRef or externally via EntityContactLabel. Check constraints can be used to prevent both the _GuidRef and the _Label for the EntityContact from being simultaneously non-null. Alternatively, appropriate programming logic can be used to maintain precedence of the internal reference via the _GuidRef over the external reference via the _Label, or vice versa, depending on the non-null values of these fields in the context of the status of the boolean field RecordIsCachedCopy.

For the resource record metadata within the main table NResource, there are also three indirectly self-referencing relations from fields with the suffix _ByAgentIidRef to three other potential resources for the RecordCreatedBy, RecordUpdatedBy, and RecordManagedBy agents. The indirect self-referencing via the auxiliary linking table NAgent (see FIG. 7) provides a simple permission management system implemented with the feature of sufficient flexibility to interface with various user account provider systems, and simultaneously, to render optional the publication of any information pertaining to agents as resources distinct from owners, contacts and registrants.

Thus, the linking table NAgent mediates between the set of tables for PDS and another set of tables for the authentication and authorization system for managing agent access to inserting, updating, and deleting records in the NEXUS tables. The linking table has a primary key AgentIidKey and various alternative optional fields available for linking to user membership providers such as the field AspnetUserGuidRef for linking to Microsoft's ASP.net membership provider, OtherUserGuidRef for linking to an alternate generic user membership provider, etc. In addition, the table NAgent provides the foreign key AgentInfosetGuidRef for linking back to a resource in the main table NResource for use in a scenario where the agents as persons with responsibility for managing resources in the database are themselves identified and described as resources in the main table.

Regardless of whether an agent is published as a resource, or vice versa, whether a resource is an agent, registrant or contact of type person or of any other type, all resources may be flagged as non-publishable by the boolean field InfosetIsPrivate in the table NResource. Also, regardless of code implementation with persistence of the value stored in the field EntityLabel or otherwise computed dynamically by concatenation of the EntityPrincipalTag with the label of the entity's registry, it should be emphasized that any PDS implementation must maintain the important requirement of uniquely identifying resources by the resource entity label which must be an IRI or URI.

An exemplary embodiment of the invention must also require the following components:

1. For each PORTAL Registry corresponding to a problem oriented domains, a means for establishing and storing the required concepts for a record to be validated in the domain wherein each concept must be represented as a character sequence, or word stem, or URI for a terminology term, or URI for a thesaurus concept, or URI for an ontology concept.
2. A matching algorithm for testing the metadata elements of the PORTAL Registry record for the presence of any of the required character sequences, word stems, terminology term URIs or thesaurus concept URIs.
3. A matching algorithm for testing the metadata elements of the same registered resource entity at the corresponding DOORS Directory record for the presence of any of the required ontology concept URIs.
4. A workflow algorithm for ordering the sequence of sub-tests within the overall validation test for the pair of PORTAL and DOORS metadata records for each registered resource entity that terminates as early as possible upon first successful pass of the validation test.
5. A means for deleting the corresponding PORTAL and DOORS metadata records for any resource entity that does not validate successfully within the time required by the PORTAL Registry. Alternatively, a means for moving and/or modifying the records so that they are re-registered in an alternative more appropriate domain within which the resource entity does validate successfully or within which no validation is required.

The following T-SQL code demonstrates an exemplary embodiment of the most important concept validating algorithms:

CREATE PROCEDURE [dbo].[pds_NResourceInfosetValidateAtPortal](

```
CREATE PROCEDURE [dbo].[pds_NResourceInfosetValidateAtPortal](
```

```
@ResourceIidKey int,
@PdsAgentIid int,
@StatusAtPortal tinyint output)
AS
BEGIN

SET NOCOUNT ON;

DECLARE @IsEditor bit, @IsAdmin bit;
SELECT @IsEditor = AgentIsEditor, @IsAdmin = AgentIsAdmin
FROM pds_NAgent WHERE AgentIidKey = @PdsAgentIid;

/* If Agent is not also (Editor or Admin) and does not have Management
permissions, then exit */
IF (@IsEditor = 0) AND (@IsAdmin = 0) AND NOT EXISTS(SELECT
RecordHandle FROM pds_NResource
WHERE (ResourceIidKey = @ResourceIidKey) AND
(RecordManagedByAgentIidRef = @PdsAgentIid))
RETURN -1;

-- compute @StatusAtPortal by testing Restricted Tags/Labels
DECLARE @NumTagRestrictions tinyint, @TagsAreValid bit,
@NumLabelRestrictions tinyint, @LabelsAreValid bit;
EXEC pds_NSupportingTagValidate @ResourceIidKey, NULL,
@NumTagRestrictions output, @TagsAreValid output;
EXEC pds_NSupportingLabelValidate @ResourceIidKey, NULL,
@NumLabelRestrictions output, @LabelsAreValid output;
IF (@NumTagRestrictions IS NULL) OR (@NumLabelRestrictions IS NULL)
RETURN -2;
IF (@TagsAreValid IS NULL) OR (@LabelsAreValid IS NULL) RETURN -3;

SET @StatusAtPortal = 2;
```

```
IF (@NumTagRestrictions > 0) AND (@NumLabelRestrictions > 0)
BEGIN
-- either/or here assumes that they are harmonized!!!
rather than independent
IF (@TagsAreValid = 1 OR @LabelsAreValid = 1) SET
@StatusAtPortal = 1
ELSE SET @StatusAtPortal = 0
END
ELSE IF (@NumTagRestrictions > 0)
BEGIN
IF (@TagsAreValid = 1) SET @StatusAtPortal = 1
ELSE SET @StatusAtPortal = 0
END
ELSE IF (@NumLabelRestrictions > 0)
BEGIN
IF (@LabelsAreValid = 1) SET @StatusAtPortal = 1
ELSE SET @StatusAtPortal = 0
END
ELSE -- no restrictions, valid by definition
SET @StatusAtPortal = 1;

-- update main record with counts, status, datetime stamp, etc
    UPDATE pds_NResource
    SET InfosetPortalStatusCode = @StatusAtPortal,
InfosetPortalStatusTestedOn = GETUTCDATE(),
RecordUpdatedByAgentIidRef = @PdsAgentIid
WHERE (ResourceIidKey = @ResourceIidKey);

RETURN ISNULL(@@ROWCOUNT,0);

END
```

```
GO

CREATE PROCEDURE [dbo].[pds_NResourceInfosetValidateAtDoors](
@ResourceIidKey int,
@PdsAgentIid int,
@StatusAtDoors tinyint output)
AS
BEGIN

SET NOCOUNT ON;

DECLARE @IsEditor bit, @IsAdmin bit;
SELECT @IsEditor = AgentIsEditor, @IsAdmin = AgentIsAdmin
FROM pds_NAgent WHERE AgentIidKey = @PdsAgentIid;

/* If Agent is not also (Editor or Admin) and does not have Management
permissions, then exit */
IF (@IsEditor = 0) AND (@IsAdmin = 0) AND NOT EXISTS(SELECT
RecordHandle FROM pds_NResource
WHERE (ResourceIidKey = @ResourceIidKey) AND
(RecordManagedByAgentIidRef = @PdsAgentIid))
RETURN -1;

-- validate existence of at least one resolveable URL
--as either a Label URI that is also URL
--or else a Location that has a URL
DECLARE @TypeCode smallint, @Count int, @LocationExists bit;
-- check for existence of LocationURL
SELECT @Count = COUNT(*) FROM pds_NLocation
WHERE (ResourceIidRef = @ResourceIidKey) AND (LocationURL IS
NOT NULL);
-- if none, then check for existence of resolvable labels, URIs that
```

```
are also URLs,
--but only for entities that are not components
IF (@Count = 0) BEGIN
SELECT @TypeCode = EntityTypeCode FROM pds_NResource
WHERE (ResourceIidKey = @ResourceIidKey);
-- check only entities that are not constituents (>=60) or
else are untyped (=0)
IF (@TypeCode >= 60) OR (@TypeCode = 0)
SELECT @Count = COUNT(*) FROM pds_NTagAndLabel
WHERE (ResourceIidRef = @ResourceIidKey) AND
(LabelIsResolvable = 1);
END;

IF (@Count > 0) SET @StatusAtDoors = 1
ELSE SET @StatusAtDoors = 0;

-- update main record with counts, status, datetime stamp, etc
    UPDATE pds_NResource
    SET InfosetDoorsStatusCode = @StatusAtDoors,
InfosetDoorsStatusTestedOn = GETUTCDATE(),
RecordUpdatedByAgentIidRef = @PdsAgentIid
WHERE (ResourceIidKey = @ResourceIidKey);

RETURN ISNULL(@@ROWCOUNT,0);

END

GO

CREATE PROCEDURE [dbo].[pds_NSupportingTagValidate](
@ResourceIidRef int,
@RecordRegistryGuidRef uniqueidentifier = NULL,
```

```
@NumRestrictions tinyint output,
@TagsAreValid bit output)
AS
BEGIN

/* use null default option for @RecordRegistryGuid to assure
validation against actual RecordRegistryGuid stored in record
rather than against some arbitrarily different input guid  */

SET NOCOUNT ON;

DECLARE @EntityTypeCode smallint, @EntityOtherGuid uniqueidentifier,
@EntityOtherRecRegGuid uniqueidentifier, @RetVal tinyint;
SET @RetVal = 0;

-- Get the @RecordRegistryGuid if necessary, also other fields needed
IF (@RecordRegistryGuidRef IS NULL)
SELECT @RecordRegistryGuidRef = RecordRegistryInfosetGuidRef,
@EntityTypeCode = EntityTypeCode, @EntityOtherGuid =
EntityOtherInfosetGuidRef
FROM dbo.pds_NResource WHERE (ResourceIidKey =
@ResourceIidRef)
ELSE
SELECT @EntityTypeCode = EntityTypeCode, @EntityOtherGuid =
EntityOtherInfosetGuidRef
FROM dbo.pds_NResource WHERE (ResourceIidKey =
@ResourceIidRef);

-- Check existence of tag restrictions from the Resource's Registry
using input @RecordRegistryGuidRef
SELECT @NumRestrictions = COUNT(*) FROM
dbo.pds_NRegistryRestrictionOrView
```

```
WHERE (RegistryGuid = @RecordRegistryGuidRef) AND
(RestrictionIsLabel = 0);
IF (@NumRestrictions = 0)
BEGIN
SET @TagsAreValid = 1; -- valid by definition when NO
restrictions exist for the registry
RETURN @RetVal;
END;

-- Check existence of EntityOther and its Registry for MetaResource
EntityTypeCode = 99
IF (@EntityTypeCode = 99)
BEGIN
SELECT @EntityOtherRecRegGuid = RecordRegistryInfosetGuidRef
FROM dbo.pds_NResource WHERE (InfosetGuidKey =
@EntityOtherGuid);
IF (@EntityOtherRecRegGuid = @RecordRegistryGuidRef) -- entity
itself and entity other in same registry
BEGIN
SET @TagsAreValid = 1; -- valid by definition when
MetaResource record is in same registry as described record
RETURN @RetVal;
END;
END;

-- Get the required tag Restrictions from the Resource's Registry
using input @RecordRegistryGuidRef
DECLARE @Restrictions table (AndIndex tinyint, OrIndex tinyint,
Restriction nvarchar(256));
INSERT INTO @Restrictions (AndIndex, OrIndex, Restriction)
SELECT RestrictionAndIndex, RestrictionOrIndex, Restriction
FROM dbo.pds_NRegistryRestrictionOrView
```

```
WHERE (RegistryGuid = @RecordRegistryGuidRef) AND
(RestrictionIsLabel = 0)
ORDER BY RestrictionAndIndex, RestrictionOrIndex;

-- Get the EntityName, EntityNature and SupportingTags for the
Resource using input @ResourceIidRef
--but only those SupportingTags where TagIsRestricted is
true;
--also note SupportingTag is nvarchar(128) while
EntityNature is nvarchar(256)
DECLARE @TestTags TABLE (TagToken nvarchar(256));
DECLARE @NumTestTags int, @NumMatches int;
INSERT INTO @TestTags (TagToken)
SELECT LOWER(EntityName) FROM pds_NResource
WHERE (ResourceIidKey = @ResourceIidRef);
INSERT INTO @TestTags (TagToken)
SELECT LOWER(EntityNature) FROM pds_NResource
WHERE (ResourceIidKey = @ResourceIidRef);
INSERT INTO @TestTags (TagToken)
SELECT LOWER(SupportingTag) FROM pds_NSupportingTag
WHERE (ResourceIidRef = @ResourceIidRef) AND
(TagIsRestricted = 1);
SELECT @NumTestTags = COUNT(*) FROM @TestTags WHERE (TagToken IS NOT
NULL);

-- initialize @TagsAreValid to false for remainder of algorithm
SET @TagsAreValid = 0;
-- If there are tag restrictions (@NumRestrictions > 0) but no test
tags (@NumTestTags = 0),
--   then return invalid else continue with test
IF (@NumRestrictions > 0) AND (@NumTestTags = 0) RETURN @RetVal;
```

```
DECLARE @AndValid bit, @AndIndex tinyint, @AndIdxMax tinyint,
@AndIdxNum tinyint;
DECLARE @OrValid bit, @OrIndex tinyint, @OrIdxMax tinyint, @OrIdxNum
tinyint;
-- Algorithm assumes convention that AndIndex = 0, OrIndex = * lists
phrases with multiple concepts per OrIndex
-- whereas AndIndex >= 1, OrIndex = * lists word stems with one
concept per AndIndex
-- For AndIndex = 0, initialize false until proven true and if true
then return else continue test for AndIndex >= 1
SET @AndIndex = 0;
SELECT @OrIdxNum = COUNT(*) FROM @Restrictions WHERE AndIndex =
@AndIndex;
IF (@OrIdxNum > 0) BEGIN
-- Algorithm assumes @OrValid false until proven true (search
loop until "accept" at least one "or")
-- Algorithm assumes that OrIndex numbered sequentially
beginning with 1,2,3,...
SET @OrValid = 0;
SET @OrIndex = 1;
SELECT @OrIdxMax = MAX(OrIndex) FROM @Restrictions WHERE
AndIndex = @AndIndex;
WHILE (@OrValid = 0) AND (@OrIndex <= @OrIdxMax) BEGIN
SELECT @NumMatches = COUNT(*) FROM @TestTags WHERE
TagToken LIKE
(SELECT Restriction FROM @Restrictions WHERE
AndIndex = @AndIndex AND OrIndex = @OrIndex);
IF (@NumMatches > 0) SET @OrValid = 1; -- at least one
"OR" has been found so accept (forces exit from inner OR while loop)
SET @OrIndex = @OrIndex + 1; -- increment OR index for
inner OR while loop
END;
```

```
IF (@OrValid = 1) BEGIN
SET @TagsAreValid = 1;
RETURN @RetVal;
END;
END;

-- For AndIndex >= 1, re-initialize true until proven false (search
loop until "reject" at least one "and")
-- Algorithm assumes that AndIndex numbered sequentially beginning
with 1,2,3,...
SELECT @AndIdxMax = MAX(AndIndex) FROM @Restrictions;
IF (@AndIdxMax > 0) BEGIN
SET @AndValid = 1;
SET @AndIndex = 1;
WHILE (@AndValid = 1) AND (@AndIndex <= @AndIdxMax) BEGIN
-- Algorithm assumes @OrValid false until proven true (search
loop until "accept" at least one "or")
-- Algorithm assumes that OrIndex numbered sequentially
beginning with 1,2,3,...
SET @OrValid = 0;
SET @OrIndex = 1;
SELECT @OrIdxMax = MAX(OrIndex) FROM @Restrictions
WHERE AndIndex = @AndIndex;
WHILE (@OrValid = 0) AND (@OrIndex <= @OrIdxMax) BEGIN
SELECT @NumMatches = COUNT(*) FROM @TestTags
WHERE TagToken LIKE
(SELECT Restriction FROM @Restrictions
WHERE AndIndex = @AndIndex AND OrIndex = @OrIndex);
IF (@NumMatches > 0) SET @OrValid = 1; -- at
least one "OR" has been found so accept (forces exit from inner OR while loop)
SET @OrIndex = @OrIndex + 1; -- increment OR
index for inner OR while loop
```

```
END;
IF (@OrValid = 0) SET @AndValid = 0; -- at least one
"AND" has not been found so reject (forces exist from outer AND while loop)
SET @AndIndex = @AndIndex + 1; -- increment AND index
for outer AND while loop
END;
IF (@AndValid = 1) BEGIN
SET @TagsAreValid = 1;
RETURN @RetVal;
END;
END;

-- no error return code
RETURN @RetVal;

END

GO

CREATE PROCEDURE [dbo].[pds_NSupportingLabelValidate](
@ResourceIidRef int,
@RecordRegistryGuidRef uniqueidentifier = NULL,
@NumRestrictions tinyint output,
@LabelsAreValid bit output)
AS
BEGIN /* use null default option for @RecordRegistryGuid to assure
validation against actual RecordRegistryGuid stored in record
rather than against some arbitrarily different input guid  */

SET NOCOUNT ON;
```

```sql
DECLARE @EntityTypeCode smallint, @EntityOtherGuid uniqueidentifier,
@EntityOtherRecRegGuid uniqueidentifier, @RetVal tinyint;
SET @RetVal = 0;

-- Get the @RecordRegistryGuid if necessary, also other fields needed
IF (@RecordRegistryGuidRef IS NULL)
SELECT @RecordRegistryGuidRef = RecordRegistryInfosetGuidRef,
@EntityTypeCode = EntityTypeCode, @EntityOtherGuid =
EntityOtherInfosetGuidRef
FROM dbo.pds_NResource WHERE (ResourceIidKey =
@ResourceIidRef)
ELSE
SELECT @EntityTypeCode = EntityTypeCode, @EntityOtherGuid =
EntityOtherInfosetGuidRef
FROM dbo.pds_NResource WHERE (ResourceIidKey =
@ResourceIidRef);

-- Check existence of label restrictions from the Resource's Registry
using input @RecordRegistryGuidRef
SELECT @NumRestrictions = COUNT(*) FROM
dbo.pds_NRegistryRestrictionOrView
WHERE (RegistryGuid = @RecordRegistryGuidRef) AND
(RestrictionIsLabel = 1);
IF (@NumRestrictions = 0)
BEGIN
SET @LabelsAreValid = 1; -- valid by definition when NO
restrictions exist for the registry
RETURN @RetVal;
END;

-- Check existence of EntityOther and its Registry for MetaResource
```

```
EntityTypeCode = 99
IF (@EntityTypeCode = 99)
BEGIN
SELECT @EntityOtherRecRegGuid = RecordRegistryInfosetGuidRef
FROM dbo.pds_NResource WHERE (InfosetGuidKey =
@EntityOtherGuid);
IF (@EntityOtherRecRegGuid = @RecordRegistryGuidRef) -- entity
itself and entity other in same registry
BEGIN
SET @LabelsAreValid = 1; -- valid by definition when
MetaResource record is in same registry as described record
RETURN @RetVal;
END;
END;

-- Get the required label Restrictions from the Resource's Registry
using input @RecordRegistryGuidRef
DECLARE @Restrictions table (AndIndex tinyint, OrIndex tinyint,
Restriction nvarchar(384));
INSERT INTO @Restrictions (AndIndex, OrIndex, Restriction)
SELECT RestrictionAndIndex, RestrictionOrIndex, Restriction
FROM dbo.pds_NRegistryRestrictionOrView
WHERE (RegistryGuid = @RecordRegistryGuidRef) AND
(RestrictionIsLabel = 1)
ORDER BY RestrictionAndIndex, RestrictionOrIndex;

-- Get the SupportingLabels for the Resource using input @ResourceIid
--but only those SupportingLabels where
LabelIsRestricted is true;
--also note SupportingLabel is nvarchar(256)
DECLARE @TestLabels TABLE (LabelUri nvarchar(256));
DECLARE @NumTestLabels int, @NumMatches int;
```

```
INSERT INTO @TestLabels (LabelUri)
SELECT LOWER(SupportingLabel) FROM pds_NSupportingLabel
WHERE (ResourceIidRef = @ResourceIidRef) AND
(LabelIsRestricted = 1);
SELECT @NumTestLabels = COUNT(*) FROM @TestLabels WHERE (LabelUri IS
NOT NULL);

-- initialize @LabelsAreValid to false for remainder of algorithm
SET @LabelsAreValid = 0;
-- If there are label restrictions (@NumRestrictions > 0) but no test
labels (@NumTestLabels = 0),
--   then return invalid else continue with test
IF (@NumRestrictions > 0) AND (@NumTestLabels = 0) RETURN @RetVal;

DECLARE @AndValid bit, @AndIndex tinyint, @AndIdxMax tinyint,
@AndIdxNum tinyint;
DECLARE @OrValid bit, @OrIndex tinyint, @OrIdxMax tinyint, @OrIdxNum
tinyint;
-- Algorithm assumes convention that AndIndex = 0, OrIndex = * lists
phrases with multiple concepts per OrIndex
-- whereas AndIndex >= 1, OrIndex = * lists word stems with one
concept per AndIndex
-- For AndIndex = 0, initialize false until proven true and if true
then return else continue test for AndIndex >= 1
SET @AndIndex = 0;
SELECT @OrIdxNum = COUNT(*) FROM @Restrictions WHERE AndIndex =
@AndIndex;
IF (@OrIdxNum > 0) BEGIN
-- Algorithm assumes @OrValid false until proven true (search
loop until "accept" at least one "or")
-- Algorithm assumes that OrIndex numbered sequentially
beginning with 1,2,3,...
```

```
SET @OrValid = 0;
SET @OrIndex = 1;
SELECT @OrIdxMax = MAX(OrIndex) FROM @Restrictions WHERE
AndIndex = @AndIndex;
WHILE (@OrValid = 0) AND (@OrIndex <= @OrIdxMax) BEGIN
SELECT @NumMatches = COUNT(*) FROM @TestLabels WHERE
LabelUri LIKE
(SELECT Restriction FROM @Restrictions WHERE
AndIndex = @AndIndex AND OrIndex = @OrIndex);
IF (@NumMatches > 0) SET @OrValid = 1; -- at least one
"OR" has been found so accept (forces exit from inner OR while loop)
SET @OrIndex = @OrIndex + 1; -- increment OR index for
inner OR while loop
END;
IF (@OrValid = 1) BEGIN
SET @LabelsAreValid = 1;
RETURN @RetVal;
END;
END;

-- For AndIndex >= 1, re-initialize true until proven false (search
loop until "reject" at least one "and")
-- Algorithm assumes that AndIndex numbered sequentially beginning
with 1,2,3,...
SELECT @AndIdxMax = MAX(AndIndex) FROM @Restrictions;
IF (@AndIdxMax > 0) BEGIN
SET @AndValid = 1;
SET @AndIndex = 1;
WHILE (@AndValid = 1) AND (@AndIndex <= @AndIdxMax) BEGIN
-- Algorithm assumes @OrValid false until proven true (search
loop until "accept" at least one "or")
-- Algorithm assumes that OrIndex numbered sequentially
```

6.2 Alternative Embodiments

Many variations on the invention are possible, and the inclusion of exemplary embodiments with figures and T-SQL code scripts for structures and algorithms in this application, the accompanying provisional applications and their attachments, with particular expressions of table, column and variable names should not be construed as limiting because alternative names, implementations and embodiments could be substituted. Alternative embodiments of the distributed network architecture, data structures and algorithms suffice as long as they implement the required principles of integrating the PORTAL registry and DOORS directory functionalities within a paradigm that features self-referencing and self-describing structures, that enables bootstrapping of the distributed network of registry and directory servers, that enables managing multilevel metadata about metadata and metaresources about resources, and that enables maintaining the integrity of the problem oriented domains with concept validating methods.

REFERENCES

[1] C. Taswell, "DOORS to the semantic web and grid with a PORTAL for biomedical computing," U.S. Patent 60/944, 517, Jun. 17, 2007, provisional application.
[2] C. Taswell, "PORTALS and DOORS for the semantic web and grid," U.S. Pat. No. 7,792,836, Sep. 7, 2010.
[3] A. Newton and M. Sanz. (2005, January) RFC3981: IRIS: The internet registry information service (IRIS) core protocol. IETF RFC 3981 Working Draft. [Online]. Available: http://www.ietf.org/rfc/rfc3981.txt
[4] P. V. Mockapetris. (1987, November) STD13 RFC1035: Domain names—implementation and specification. IETF Full Standard. [Online]. Available: http://www.ietf.org/rfc/rfc1035.txt
[5] C. Taswell, "DOORS to the semantic web and grid with a PORTAL for biomedical computing," *IEEE Transactions on Information Technology in Biomedicine*, vol. 12, no. 2, pp. 191-204, February 2008, in the Special Section on Bio-Grid.
[6] C. Taswell, "A distributed infrastructure for metadata about metadata: The HDMM architectural style and PORTAL-DOORS system," *Future Internet*, vol. 2, no. 2, pp. 156-189, 2010, in Special Issue on Metadata and Markup. [Online]. Available: http://www.mdpi.com/1999-5903/2/2/156/
[7] K. Shafer, S. Weibel, E. Jul, and J. Fausey. (1996, March) Introduction to persistent uniform resource locators. [Online]. Available: http://purl.oclc.org/docs/inet96.html
[8] C. Taswell, "Use of NLM medical subject headings with the MeSH2010 thesaurus in the PORTAL-DOORS system," in *Proceedings of 8th HealthGrid 2010 Paris*, ser. Studies in Health Technology and Informatics, T. Solominides, I. Blanquer, V. Breton, T. Glatard, and Y. Legre, Eds., vol. 159. IOS Press, 2010, pp. 255-258.
[9] C. Taswell, "Alternative bootstrapping design for the PORTAL-DOORS cyberinfrastructure with self-referencing and self-describing features," in Semantic Web, G. Wu, Ed. Vukovar, Croatia: In-Teh, 2009, ch. 2, pp. 29-37. [Online]. Available: http://sciyo.com/books/show/title/semantic-web

What is claimed is:

1. A method for operating a distributed network system of internet client-server devices for resource metadata management, comprising:

a distributed network system of stationary and mobile computers acting as server, client or client-server computing devices;

providing a metadata representation for each of a plurality of resources, wherein said each of the resources is an entity including an item comprising a unique uniform resource identifier (URI), a person, an organization, a publication, a product, an event, or an activity;

registering said each of the resource entities at one of a plurality of separate registries or at a registry component of one of a plurality of combined registry-directories, wherein said each of the registered resource entities is identified by a globally unique URI;

publishing said each of the resource entities at one of a plurality of separate directories or at a directory component of one of a plurality of combined registry-directories, wherein said each of the registered and identified resource entities is specified with a location and description;

receiving two or more queries by a query parser, determining, by the query parser, at least one of the two or more queries is a non-semantic query and at least one of the remaining of queries is a semantic query;

forwarding, by the query parser, the at least one non-semantic query to the separate registries or to the registry components of the combined registry-directories, wherein the registries and the registry components of the registry-directories are configured to manage and publish non-semantic metadata;

forwarding, by the query parser, the at least one remaining semantic query only to the separate directories or to the directory components of the combined registry-directories, wherein the directories and the directory components of the registry-directories are configured to manage and publish semantic metadata, wherein the semantic metadata is in resource description framework (RDF) or web ontology language (OWL) format;

identifying a metadata record within the metadata of the one of the registries or the one of the registry components of the registry-directories for a selected resource entity of the resource entities in response to the at least non-semantic query;

identifying a metadata record within the metadata of the one of the directories or the one of the directory components of the registry-directories for a selected resource entity of the resource entities in response to the remaining semantic query;

searching for the at least one non-semantic query for one or more of the resource entities across at least one of the registries or the registry components of the registry-directories to at least one of the directories or the directory components of the registry-directories;

searching for the at least one remaining semantic query for one or more of the resource entities across at least one of the directories or the directory components of the registry-directories to at least one of the registries or the registry components of the registry-directories;

returning a message with a set of zero not-found metadata records or a plurality of one or more found metadata records where each metadata record is returned in either a registry format with the set of data fields stored for each metadata record in the registry, a directory format with the set of data fields stored for each metadata record in the directory or a combined registry-directory format with the set of data fields stored for each metadata record in the combined registry-directory as appropriate for each metadata record found respectively in either a registry, directory or combined registry-directory searched in the set of one or more registries, directories or combined registry-directories queried by the one or more non-semantic or semantic queries.

2. The method according to claim 1, wherein the semantic metadata is in a triple format equivalent to the RDF format via a mapping.

3. The method according to claim 1, wherein the non-semantic metadata is in free text, hypertext markup language (HTML), extensible markup language (XML), or non-triple format.

4. The method according to claim 1, further comprising:
performing cross-linking between the resource entities via a mapping wherein the cross-linking may be further characterized by the types of the resource entities that are the source and the target of the cross-linking;
providing a plurality of resource entity types, at least one of which is a type called a metaresource and defined as the type of an entity that exists only in a manner dependent upon the existence of a different independent resource entity.

5. The method according to claim 1, further comprising:
providing control of the distribution of the metadata records under a hierarchy of authoritative and non-authoritative servers in response to the at least non-semantic query or the remaining semantic query.

6. The method according to claim 5, wherein the hierarchy is configured to enable the administrator of each of the registries to maintain local control based on the policies and rules defined by the administrator.

7. The method according to claim 1, further comprising:
managing the metadata of the metadata records, both conceptually and technically, with an organizational hierarchy of metadata about metadata with the use of meta-levels wherein a metalevel exists for each of the entity metadata, record metadata, infoset metadata, representation metadata and message metadata.

8. The method according to claim 1, further comprising:
providing a metadata representation for the scope of the problem oriented domain declared for each of the registries or the registry components of the registry-directories wherein the validating concepts that define the scope are specified as a character sequence, or a word stem, or a URI for a terminology term, or a URI for a thesaurus concept, or a URI for an ontology concept;
testing the metadata fields of the metadata records at the registries or the registry components of the registry-directories for the presence of any of the character sequences, the word stems, the terminology term URIs or the thesaurus concept URIs defined and required by the problem oriented domain scope;
testing the metadata fields of the metadata records at the directories or the directory components of the registry-directories for the presence of any of the ontology concept URIs defined and required by the problem oriented domain scope;
ordering and processing the sequence of sub-tests within the overall validation test for the metadata for each registered resource entity wherein the processing terminates as early as possible upon first successful pass of the validation test;
deleting the corresponding metadata records for any resource entity that does not validate successfully within the time defined and required by the problem oriented domain scope;
moving the corresponding metadata records from the initial source registry or the initial source registry component of a registry-directory to an alternate target registry or the registry component of an alternate target registry-directory for any resource entity that does not validate successfully at the initial source if the move of the metadata from the source to the target is permitted by the problem oriented scopes defined and required for both the initial source and the alternate target.

\* \* \* \* \*